L. W. MELCHER.
LUBRICATING DEVICE FOR ENGINES.
APPLICATION FILED NOV. 7, 1918.
1,307,204.
Patented June 17, 1919.
2 SHEETS—SHEET 1.
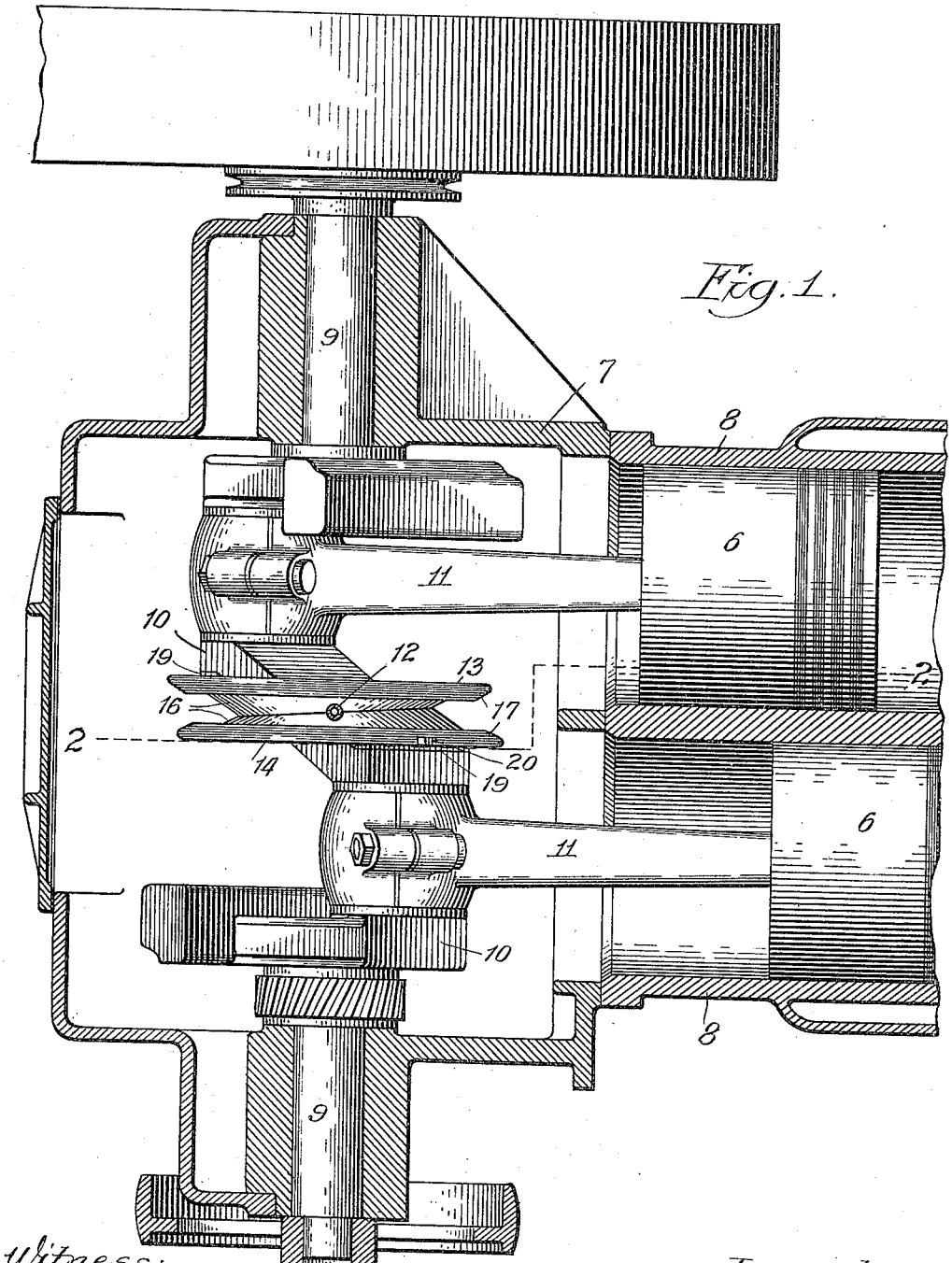

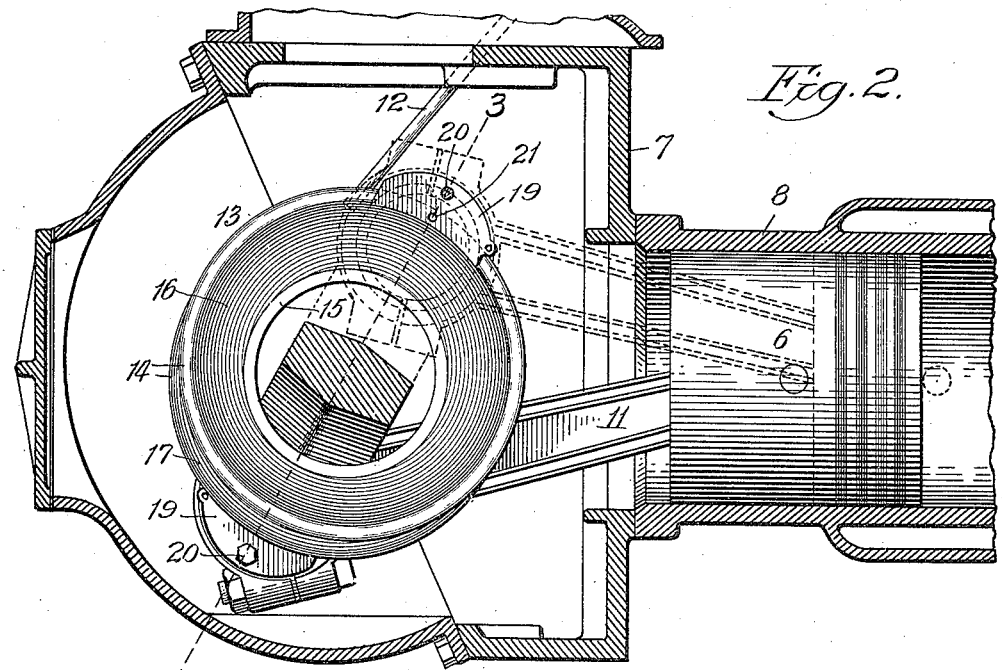

UNITED STATES PATENT OFFICE.

LEE W. MELCHER, OF LA CROSSE, WISCONSIN, ASSIGNOR TO LA CROSSE TRACTOR CO., OF LA CROSSE, WISCONSIN, A CORPORATION OF DELAWARE.

LUBRICATING DEVICE FOR ENGINES.

1,307,204.  Specification of Letters Patent.  Patented June 17, 1919.

Application filed November 7, 1918. Serial No. 261,456.

*To all whom it may concern:*

Be it known that I, LEE W. MELCHER, a citizen of the United States, and a resident of La Crosse, in the county of La Crosse and State of Wisconsin, have invented certain new and useful Improvements in Lubricating Devices for Engines, of which the following is a full, clear, and exact description.

The invention relates to lubricating devices for engines. Grooved distributing rings have heretofore been used in accordance with Letters Patent No. 1,293,382 to conduct lubricant to the wrist pins of the crank shaft to lubricate the connection between the pitmen and the cranks. These rings have been V-shaped or flared outwardly, with a view of distributing lubricant deposited centrally or in the deepest portion of the groove to both sides of the ring, but in practice it is found that when the engines are used on tractors or vehicles, even distribution of the lubricant does not result, because of the constant variation in the inclination or departure from horizontal of the vehicle when traveling over inclines or obstructions.

One object of the invention is to provide an improved lubricating ring of this character in which provision is made for effective distribution of the oil to both of the cranks despite inclination of the crank shaft or engine.

The invention consists in the several novel features hereinafter set forth and more particularly defined by claims at the conclusion hereof.

In the drawings: Figure 1 is a longitudinal section of an explosive engine embodying the invention. Fig. 2 is a section taken on line 2—2 of Fig. 1. Fig. 3 is a detail section taken on line 3—3 of Fig. 2.

The invention is illustrated as applied to an engine comprising a crank case 7 provided with cylinders 8, shaft 9 provided with oppositely disposed cranks 10 and pitmen 11 connecting the cranks and the piston 6 in the cylinders respectively, as well understood in the art.

The lubricant is conducted into the crank-case by any suitable means, such as a pipe 12, to which the oil may be supplied in regulated quantity by a pump or other suitable means for the purpose of lubricating the cranks, as well understood in the art. The pipe 12 is disposed to deliver the oil into the crank case at a point located longitudinally between the cranks 10—10 and into a distributing ring 13. This ring is preferably formed of sheet metal members 14 for convenience in manufacture. These members are provided with abutting flanges 15 which have their inner faces welded together, and each has an outwardly inclined or flared side wall 16, and an inturned trap-flange or wall 17. The inturned flange forms a retaining groove 18 for the lubricant. Each member 16 of the distributing ring has its outer face welded to a plate 19 and these plates are respectively secured to the inner sides of the cranks 10 by screws 20. A duct 21 extends through the side wall of one member of the ring, the attached side plate and the crank, to which the plate is connected for the purpose of conducting lubricant from one groove 18 to one of the wrist-pins, and a similar duct leads from the other ring member to the periphery of the other crank. The flared formation of the ring members forms, in effect, a V-shaped receiving groove in the ring, each side of which is adapted to direct lubricant to one of the ducts 21. In lieu of forming the meeting edges of the members 14 so they will lie in a plane perpendicular to the axis of the crank-shaft, they are inclined relatively to that axis so that the different portions of the receiving groove in the distributing ring will be disposed at different longitudinal points, so that oil from the feed pipe will be fed alternately onto one side of the ring and then to the other, in lieu of being dropped at the deepest or central portion of the groove when the engine is level, and all of the oil on one of the rings, when the engine is inclined.

For the purpose of causing the lubricant delivered into the respective grooves 18 to speedily deliver the lubricant to the respective ducts 21, the members 14 of the ring are eccentrically disposed relatively to the axis of the shaft so the portions adjacent the ducts 21 will be farther from said axis than the remaining portions and, as a result, centrifugal force will cause any lubricant passing into one of the grooves 18 to be delivered to the duct 21 to which it is connected.

In operation, oil from the feed-pipe 12 will be deposited into the receiving groove of the lubricating ring and as a result of longitudinally offsetting different portions of the ring, some of the oil will drop onto one member of the ring and be conducted outwardly by centrifugal force on the wall 16 thereof to one of the cranks, and at other times the oil will be deposited on the other ring member and be similarly conducted to the other crank, the grooves 18 serving to guide the oil into the outlets 21. This distribution of the oil occurs, notwithstanding inclination of the engine.

The invention exemplifies an improved distributing ring whereby distribution of the oil between the adjacent cranks is insured.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a shaft provided with cranks, of an oil distributing ring and grooved to receive and conduct oil to the sides thereof, means for supplying oil to the ring, and means for delivering oil from the ring-sides to the cranks, the sides of the ring adjacent the delivery means being farther from the axis of the shaft than other portions thereof.

2. The combination with a shaft provided with cranks, of a distributing ring having a receiving groove with portions thereof relatively offset longitudinally of the shaft, means for supplying oil to the ring, and means for delivering oil from the ring-sides to the cranks, the sides of the ring adjacent the delivering means being farther from the axis of the shaft than other portions thereof.

3. The combination with a shaft provided with cranks, of an eccentric oil distributing-ring disposed between the cranks and grooved to receive and conduct oil to the sides thereof, means for supplying oil to the ring, and means for delivering oil from the outermost portions of the eccentric ring to the cranks.

4. The combination with a shaft provided with cranks, of an eccentric oil distributing ring disposed between the cranks and having a groove formed with portions thereof offset longitudinally of the shaft, means for supplying oil to the ring, and means for delivering oil from the outermost portions of the eccentric ring, to the cranks.

5. The combination with a shaft provided with cranks, of an oil distributing ring centrally grooved to receive and conduct oil to the sides thereof, and comprising annular members eccentrically disposed around the axis of the shaft, means for supplying oil to the ring, and ducts for delivering oil from the outermost side-portions of the ring to the cranks.

6. The combination with a shaft provided with a pair of cranks, of an oil distributing ring having sides forming a receiving groove between them to distribute the oil to the sides, the latter being provided with oil conducting grooves adjacent their peripheries, means for supplying oil to the ring, and means for conducting oil from the conducting grooves to the cranks respectively, those portions of the oil retaining grooves adjacent the cranks being disposed farther from the axis of the shaft than the remaining portions.

7. The combination with a shaft provided with a pair of cranks, of an oil distributing ring disposed between the cranks and having sides forming a receiving groove formed between them, so that the line of their intersection does not lie in the plane of the revolution to distribute the oil to the sides, the latter being provided with oil conducting grooves adjacent their peripheries, means for supplying oil to the ring, and means for conducting oil from the conducting grooves to the cranks respectively, those portions of the oil retaining grooves adjacent the cranks being disposed farther from the axis of the shaft than the remaining portions.

LEE W. MELCHER.

Copies of this patent may be obtained for five cents each, by addressing the "Commissioner of Patents, Washington, D. C."